(12) United States Patent
Ramirez-Diaz et al.

(10) Patent No.: US 7,310,111 B2
(45) Date of Patent: Dec. 18, 2007

(54) VIDEO MONITORING AND SECURITY SYSTEM

(75) Inventors: Luis G. Ramirez-Diaz, Carolina, PR (US); Pedro L. Cruz-Burgos, Caguas, PR (US); Dan F. Rodriguez, Guaynabo, PR (US)

(73) Assignee: Innovation Institute, Caguas, PR (US)

( * ) Notice: Subject to any disclaimer, the term of this patent is extended or adjusted under 35 U.S.C. 154(b) by 689 days.

(21) Appl. No.: 10/268,827

(22) Filed: Oct. 10, 2002

(65) Prior Publication Data

US 2003/0085998 A1 May 8, 2003

Related U.S. Application Data

(63) Continuation-in-part of application No. 09/372,944, filed on Aug. 12, 1999, now Pat. No. 6,476,858.

(51) Int. Cl.
H04N 7/18 (2006.01)
(52) U.S. Cl. .................. 348/159; 348/143; 348/152
(58) Field of Classification Search .............. 348/159, 348/154, 143, 152; 382/192, 104; 340/541
See application file for complete search history.

(56) References Cited

U.S. PATENT DOCUMENTS

| | | | |
|---|---|---|---|
| 4,249,207 A | 2/1981 | Harman et al. | |
| 4,876,597 A | 10/1989 | Roy et al. | |
| 4,962,473 A * | 10/1990 | Crain | 340/541 |
| 4,992,866 A | 2/1991 | Morgan | |
| 5,091,780 A | 2/1992 | Pomerleau | |
| 5,283,644 A * | 2/1994 | Maeno | 348/152 |
| 5,333,208 A | 7/1994 | Massen | |
| 5,396,284 A | 3/1995 | Freeman | |
| 5,467,402 A * | 11/1995 | Okuyama et al. | 382/104 |
| 5,479,526 A | 12/1995 | Benton et al. | |
| 5,581,297 A | 12/1996 | Koz et al. | |
| 5,583,796 A | 12/1996 | Reese | |
| 5,608,653 A | 3/1997 | Palmer et al. | |
| 5,619,183 A | 4/1997 | Ziegra et al. | |
| 5,625,410 A * | 4/1997 | Washino et al. | 348/154 |
| 5,745,167 A | 4/1998 | Kageyu et al. | |
| 5,798,798 A | 8/1998 | Rector et al. | |
| 5,818,935 A | 10/1998 | Maa | |
| 5,831,669 A | 11/1998 | Adrain | |
| 5,847,760 A | 12/1998 | Elmaliach et al. | |
| 5,852,610 A | 12/1998 | Olaniyan | |
| 5,854,654 A | 12/1998 | Zwahlen et al. | |
| 5,872,784 A | 2/1999 | Rostoker et al. | |
| 5,875,304 A | 2/1999 | Winter et al. | |
| 5,926,210 A | 7/1999 | Hacket et al. | |
| 5,929,904 A | 7/1999 | Uchida | |
| 5,956,424 A * | 9/1999 | Wootton et al. | 382/192 |
| 5,982,418 A | 11/1999 | Ely | |

(Continued)

*Primary Examiner*—Allen Wong
(74) *Attorney, Agent, or Firm*—Roberto J. Rios; Hoglund & Pamias, PSC

(57) ABSTRACT

A computer especially suitable for use as a video-based security system includes video inputs, a processor and a network connection. The video inputs are each configured to receive an electronic video signal from a video camera. The processor operates on a digital representation of the electronic video signals from the video inputs. When the computer detects motion in the electronic video signals it generates a compressed representation of the video signal that includes the motion. The compressed representation is transmitted through the network connection.

13 Claims, 11 Drawing Sheets

U.S. PATENT DOCUMENTS 6,069,655 A * 5/2000 Seeley et al. ............... 348/154
6,097,429 A 8/2000 Seeley et al.
6,690,411 B2 * 2/2004 Naidoo et al. .............. 348/143

* cited by examiner

Video Sentinel Client
User Interface
showing 4 camera windows

Camera window components

Video Sentinel Client
User Interface
showing 16 camera windows

Camera view windows
resized by user

Windows resized by user
and running another aplication
such as a Word processor

Video Database record viewing window

VIDEO MONITORING AND SECURITY SYSTEM

FIELD OF THE INVENTION

This invention relates generally to security and control systems and, in particular, to a computerized video monitoring and security system based on a standard PC platform.

BACKGROUND OF THE INVENTION

Alarm and security systems are now common additions to many homes and businesses. Sophisticated systems are able to communicate with a control center to alert the police, fire department, security center or a property owner. Although such systems are able to communicate an intrusion or event to some extent, the user or operator of the system is unable to visually verify what actually happened at the remote location. As such, when a false alarm occurs, the user of the system or the authority in charge must physically travel to the alarm site to verify what actually happened.

Other systems based on remote video surveillance are able to monitor remote premises, but the user of the system must, from time to time, activate a remote console to view what is happening at a remote location. For example, the user of the system may have to establish a dial-up connection across normal telephone lines. A dial-up connection may represent an additional expense, since in order to monitor the remote location, the user has to remain on line for several minutes until a video image arrives. Also, since such systems are for remote monitoring only and do not provide automated video recording, any events that they happen while waiting may be lost.

Other systems employ video cameras connected to a VCR or a VCR with a time-lapse recorder. These systems are able to record large amounts of video imagery, but the information is sequential, and retrieving the information once recorded is a tedious process since the tape must be rewound and a fast search performed to avoid missing an event. Several minutes of searching are required through all the recorded information, and once the tape reaches the end, the system stops and will not record further. Another problem with systems of this kind is that they do not provide any communications in support of remote monitoring.

More recently, more intelligent video security systems have been described which employ motion detection in hardware as well in software. Some of these systems employ local storage and communications software to connect to a centralized server. Some are able to communicate an alarm event to a monitoring center, but this is carried out across dial-up lines, and there is an expense involved in the time spent while the line is in use.

U.S. Pat. No. 5,396,284 to Freeman discloses a multiple camera system, which incorporates motion detection performed by a Central Processing Unit (CPU). Once motion is detected, the CPU sends a signal to a TDM (time-division-multiplexed) controller located at a short distance. The TDM controller switches to the camera that detected the motion, and displays the video information on a monitor and, at the same time, video information is recorded on a recording media. Since the video signal has not been digitized on the side of the TDM controller, it is clear that the recording media must be a VCR. There are no provisions for storing video information on a hard disk based system and also the video information is non-digital.

U.S. Pat. No. 5,625,410 to Washino discloses a PC based system for monitoring and storing representative images from video cameras that may be utilized for security applications or monitoring applications. This system employs a video capture card, which digitizes and compresses video information from analog or digital cameras. The system displays the video information and continuously records the compressed video information on different media such as tape, hard disk or PCMCIA, or removable hard disk. Alarm-type motion sensors are used to reconfigure the system, such as altering image size and frame rates. The system may also employ a remote server, which allows a user to monitor or continuously record video information. The preferred embodiment does not disclose a particular motion detection algorithm, however.

U.S. Pat. No. 4,511,886 to Rodriguez discloses an electronic security and surveillance system having a central monitoring station which can be located over large distance, for example across microwave links. In order to transmit the video signal over distance the video information is modulated onto a carrier.

U.S. Pat. No. 5,581,297 to Koz discloses a low-power video security system which detects motion from a single video camera, a digital compression subsystem compresses the image, and starts transmitting the compressed image over ISDN lines to a monitoring facility. Koz does not disclose a system with a plurality of cameras, nor will the system work on a network or Internet.

SUMMARY OF THE INVENTION

The present invention resides in a computerized video security and monitoring system, preferably based on a standard PC platform. The system employs video digitizing and digital I/O technology to monitor and process video information from video cameras, and ON/OFF status information from sensors to trigger alarm events, and to allow the user to receive or monitor events via a network, including the Internet. The system can be used to view past events logged in a video database, as well as to monitor live video from local or remote locations. The locations may be from anywhere in the world, provided that there is a web-browser terminal, an interactive Internet kiosk, or a PC executing the appropriate software.

The software employs camera windows that can be moved or resized to meet user's viewing needs. Video information from a single camera or from a plurality of cameras is independently digitized, scaled and displayed on different windows. Image size and selection for black and white or color may be varied according to the NTSC standard 160×120, 320×240 and 640×480. Although the source image may be digitized at a fixed rate, (i.e., 640× 480), it may be scaled to fit a portion of a screen through software control.

Controls are also provided enabling the user to select different images sizes. Although the size of the digitized image is fixed, display of the image in the screen may be varied in size according to the monitor used and the number of cameras displayed. In addition, since the camera windows are resizable by the user, some windows may be larger than others. The display of the images, preferably follow a standard 4/3 aspect ratio, so when the user resizes the window, the horizontal and vertical scale ratios are maintained. All the camera windows are integrated into a single window, which incorporates a menu, tool bar and status bar. The window can also be resized allowing the user to put the mainframe window anywhere in the computer screen. This option allows the user to run programs on the same computer, while the application is running.

The digitized information from each video camera is alternatively analyzed using image processing techniques and to trigger alarm events. Other alternatives provide ON/OFF signals from devices such as infrared sensors, motion sensors, alarm signals or cameras with built-in motion detection. To sense ON/OFF signal states the software constantly monitors digital I/O logic until a signal activates, generating an alarm event. Once the alarm event occurs, the digitized camera image may then be saved in a database, or, alternatively, transmitted over a network or Internet to one or more remote locations.

When a trigger event is used to send an e-mail through the Internet, the compressed video image is preferably combined with a textual message, encoded in Internet SMTP and MIME format and sent to a mail server. In addition to e-mail, a beeper/pager may be sent to the user telling that an alarm event has occurred. Upon receiving a beeper signal, the user may enter into a mail account using a standard web-browser, and view the image or a plurality of images from different cameras.

When a trigger event occurs, digitized camera information is compressed through JPEG compression. The information is then stored on the computer hard disk in a video database and assigned a record number. The date, time and camera number is also saved as part of the same record in the database. In addition, video information is alternatively transmitted in JPEG compressed format over a network or Internet to a server, which is part of the software provided.

The server preferably incorporates a structured video database resident on a hard disk, enabling local or remote information to be retrieved through a user-friendly console that incorporates controls very similar to those of a compact disk player. Record information is retrieved, decompressed by software and displayed in a random fashion since the user can easily go to the beginning, middle, end or any other record position by moving a slider control or the use of a single step and fast search buttons. The invention is not limited in terms of video standard, and supports NTSC, PAL, SECAM, or any other cameras with higher resolutions.

It is an object of the invention to provide encryption of date, time and camera identification information, which can be incorporated in the video image itself, ensuring that the chronological time event is authentic.

Although the current embodiment runs on a PC based platform, it is another object of the invention to port the hardware and software provided to an embedded system, including audio and video capture PC interface cards designed by other manufacturers.

It is a further object of the invention to provide support for the remote monitoring of analog and digital signals. Applications may be industrial, medical, remote control, remote sensing and home automation.

DETAILED DESCRIPTION OF THE INVENTION

The present invention resides in a system wherein a plurality of video cameras may be monitored from a local or remote location. The system records video camera information in a compressed format when motion is detected either by analyzing the camera video signal or through motion detection devices. The invention provides communications allowing an operator to view and control camera information and status signals from devices from anywhere in the world, exploiting low-cost Internet resources or existing local networks. The system is also capable of advising a user when an alarm event occurs by sending a video image of the camera or a plurality of cameras, a beeper, or an auditive or textual message via any other appropriate communications means.

Figure 7:
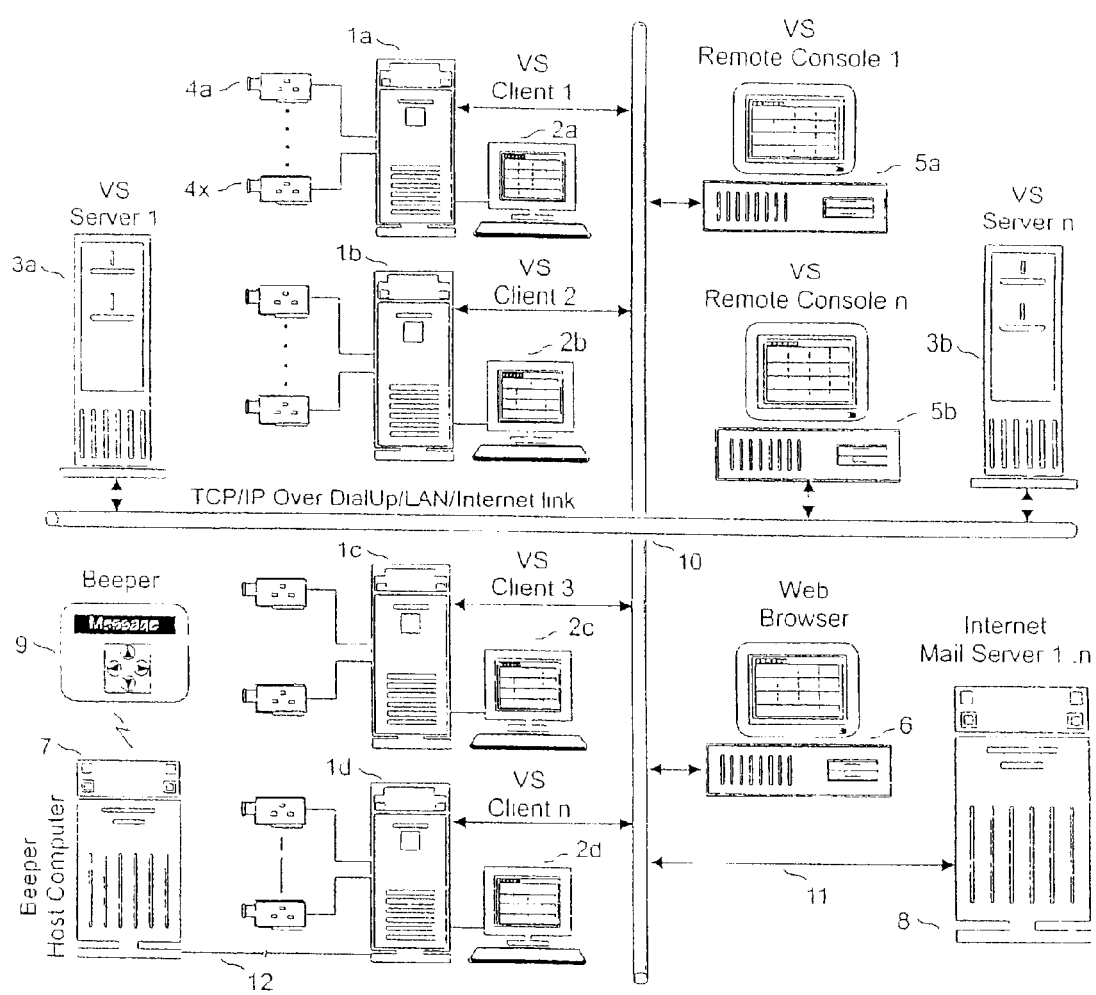
FIG. 7 shows a network of possible system configurations.

Referring to FIG. 7, the block diagram shows a network of different configurations to which the invention is applicable. The invention combines hardware residing inside systems 1a-1d, and software loaded on standard PC platforms 1a-1d, 3a-3b, and 5a-5b. Other pieces of software running on devices 6, 7 and 8 are preferably provided by different vendors.

The software running on 1a-1d, called the VS client, controls the hardware referenced in the block diagram of FIG. 8. The software that runs on 3a-3b is named the VS server, and the software that runs on 5a-5b is named the VS remote console. The system allows for multiple configurations in which a plurality of VS clients, VS servers, VS remote consoles interact with Internet mail server 8, beeper host computer 7, and web browser terminal 6, which may exist at different physical locations, all interconnected via a network or the Internet. The network topology may be implemented across a local area network, dial-up lines, dedicated lines, cellular phones, satellite links, or any other data link supporting the Internet TCP/IP protocol.

Figure 8A:
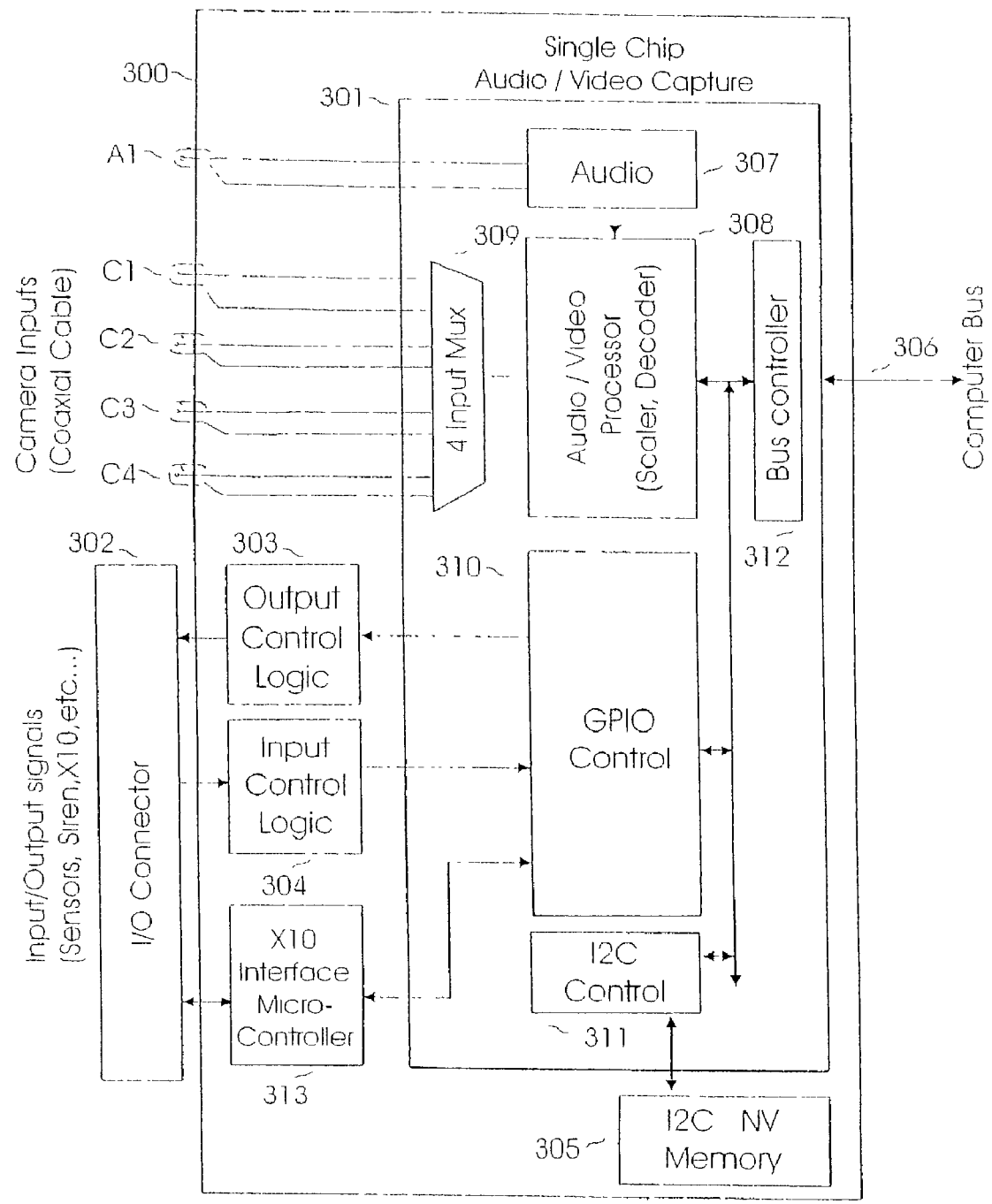
FIG. 8A is a block diagram of audio, video-capture and digital I/O cards used for digitizing camera video images and for reading input device signal status.

FIG. 8A is a block diagram showing the audio, video capture and digital I/O card used by the VS client. The interface card 300 preferably uses a single chip 301 that contains audio input logic 307, a four-input video multiplexer (mux) 309, audio/video processor 308, GPIO (General Purpose Input/Output) control 310, I2C control 311 and bus controller 312. The four input video mux 309 may be controlled by software to select one video input at a time. The video processor 308 digitizes video information from the video mux 309, and outputs this digital information to the computer bus 306 across the bus controller 312.

The GPIO control 310 is a device that accepts standard TTL level input signals and generates TTL-level output signals. The output logic 303 provides four TTL level signals and four signals with the current and voltage rating to drive relays. The input logic 304 provides four TTL level signals and four optically coupled signals, which can be used to monitor signals coming from devices that are located far from the computer.

The I2C control 311 is a serial controller that communicates with serial non-volatile (NV) memories such as I2C NV memory 305. Memory 305 is used to control software piracy and maintain track and serialization of distributed installations. An encrypted serial number is recorded in the NV memory 305 during its manufacture. The I/O connector 302 is a connector that goes on the back of the computer as well as the camera inputs C1-C4 and the audio connector A1.

The X10 Interface micro-controller 313 is used to control and/or read the status of X10 devices over the AC power grid. This micro-controller runs a program to receive commands from the PC software over the GPIO and translate it to X10 commands, which are send over the AC power grid. In an alternate scenario, X10 commands, coming from X10 devices are translated to commands that can be interpreted by the PC software.

In terms of functionality, video information from camera C1-C4 is fed into the video mux 309. The software consists of two independent modules or engines working in multi-threading/multi-tasking. One software module selects at different intervals one input of the mux 309 at a time, feeding the signal to the video processor 308, which digitizes the video signal and transmits the digital stream across the computer bus to the computer memory. During software initialization, each camera signal is assigned a different location in memory. Another module of the software is constantly retrieving this information from memory, displaying it on its respective position in the screen as shown in FIGS. 1-4, alternatively analyzing it for motion and transmitting it over the network as shown in FIG. 7. According to an alternate scenario, digital I/O information entering at 302 from different devices such as motion sensors, alarm signals, door switches or cameras with built-in motion sensors, is level sampled across devices 304 and 310, and transmitted over the computer bus 306 to computer memory. These level signals are flags that tell the software if a device has been activated or not. Upon receiving such signal, the software decides whether or not to activate an alarm event.

Figure 8B:
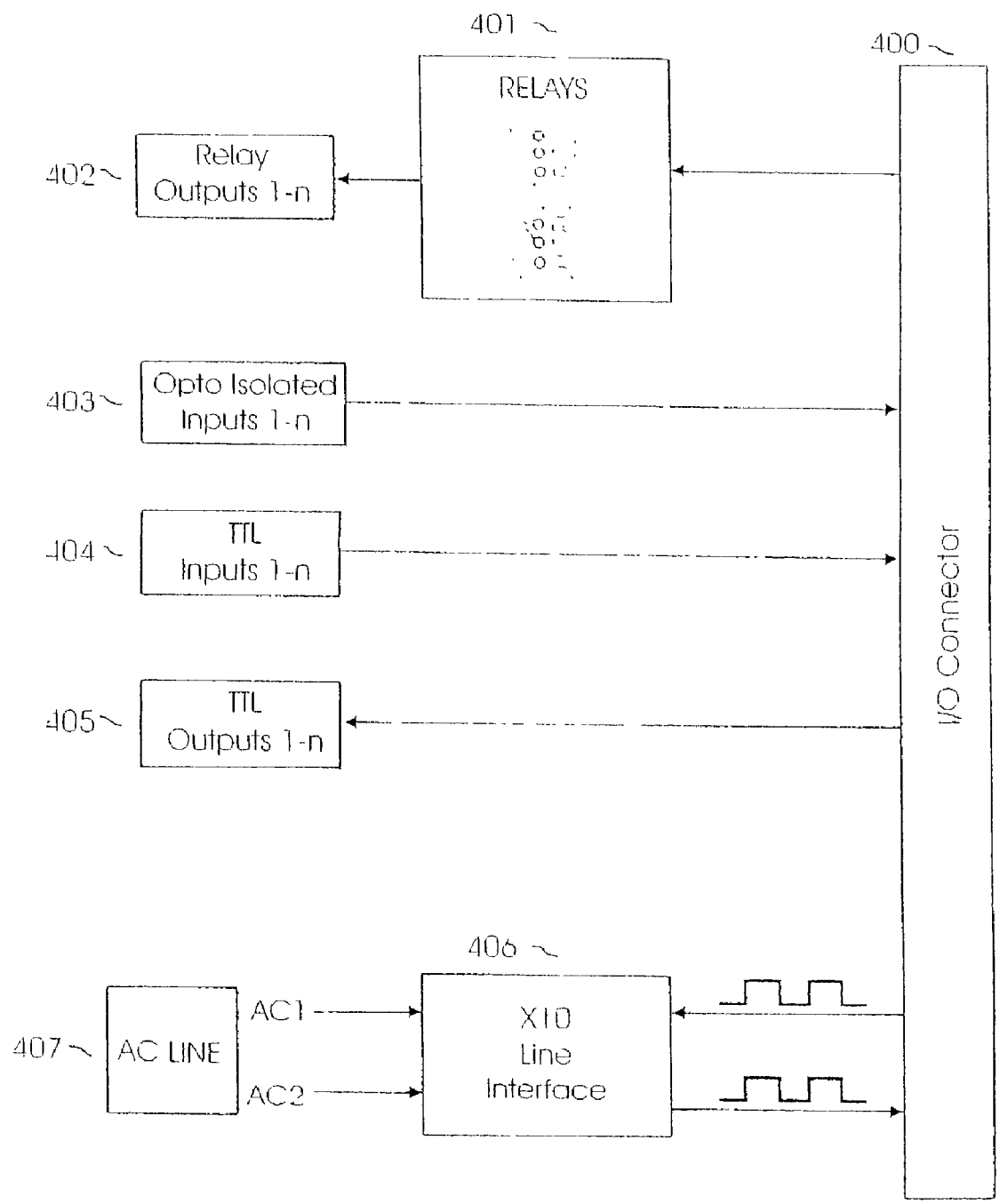
FIG. 8B is a block diagram of the I/O connector showing interface signals used to connect to external input and output devices.

FIG. 8B is a block diagram showing the different signals levels and signal formats that can be interfaced to the I/O connector 400 (item 302 in FIG. 8A). The I/O connector provides signals with the voltage and current levels to drives relays 401 which can be used to control any isolated system connected across 402, including alarm systems, sirens, lamps or any other device to be controlled.

Input devices such as motion sensors and switches may be monitored across the optically isolated inputs 403 or over the TTL inputs 404. In addition, TTL outputs 405 can be used to control other devices directly or through the addition of a high-current driver. The X10 AC line interface 406 is a unit manufactured by X10 (USA) Inc. The unit converts TTL level commands from the micro-controller depicted as 313 in FIG. 8A into a modulated 125 KHZ carrier signal that is transmitted over the AC power line 407. This unit also detects the zero level crossing of the AC power line 407 allowing the micro-controller to synchronize its transmission when the voltage level on the AC power line 407 is near zero.

Figure 9A:
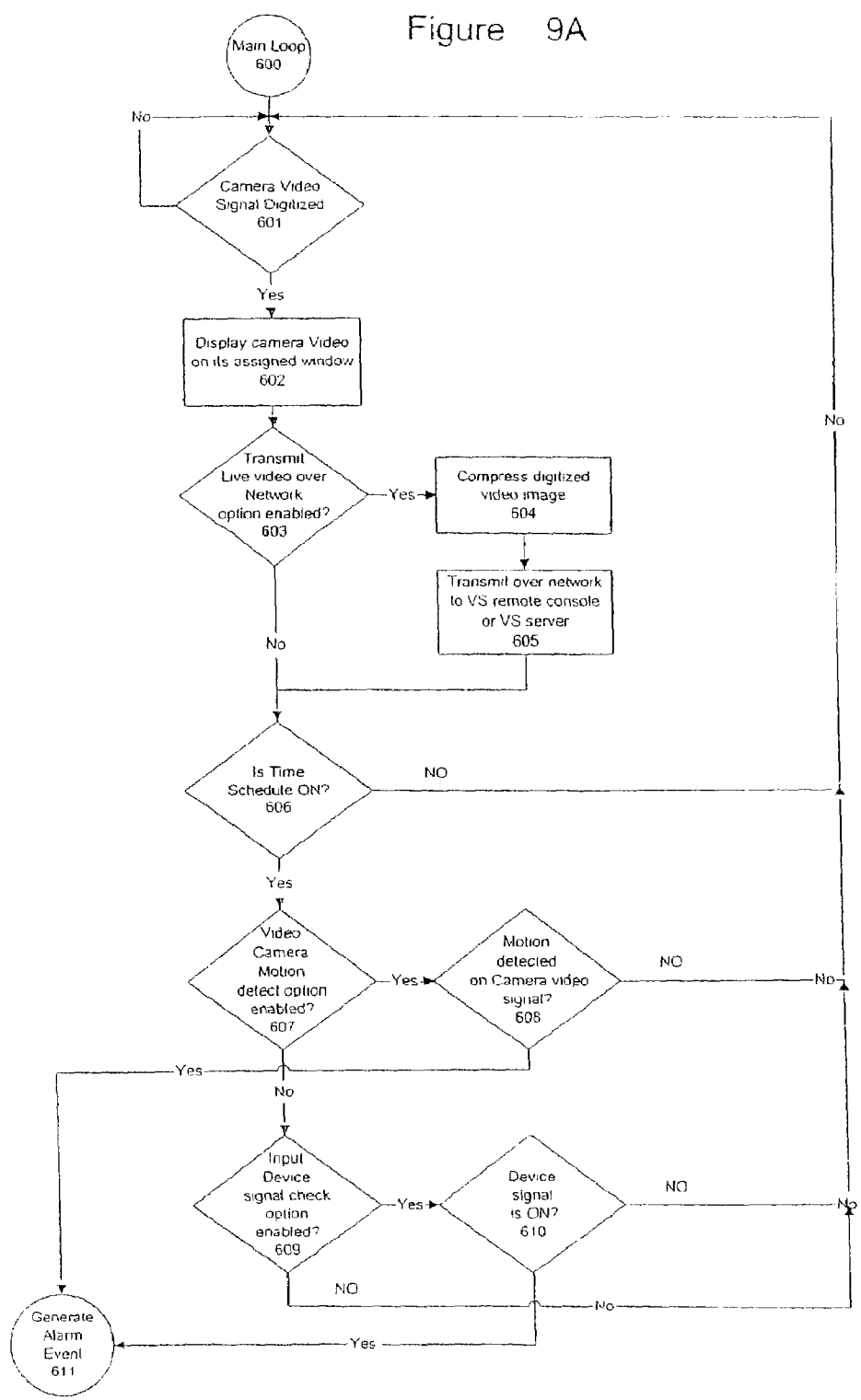
FIG. 9A is a block diagram of a first portion of the software for a system according to the invention.
Figure 9B:
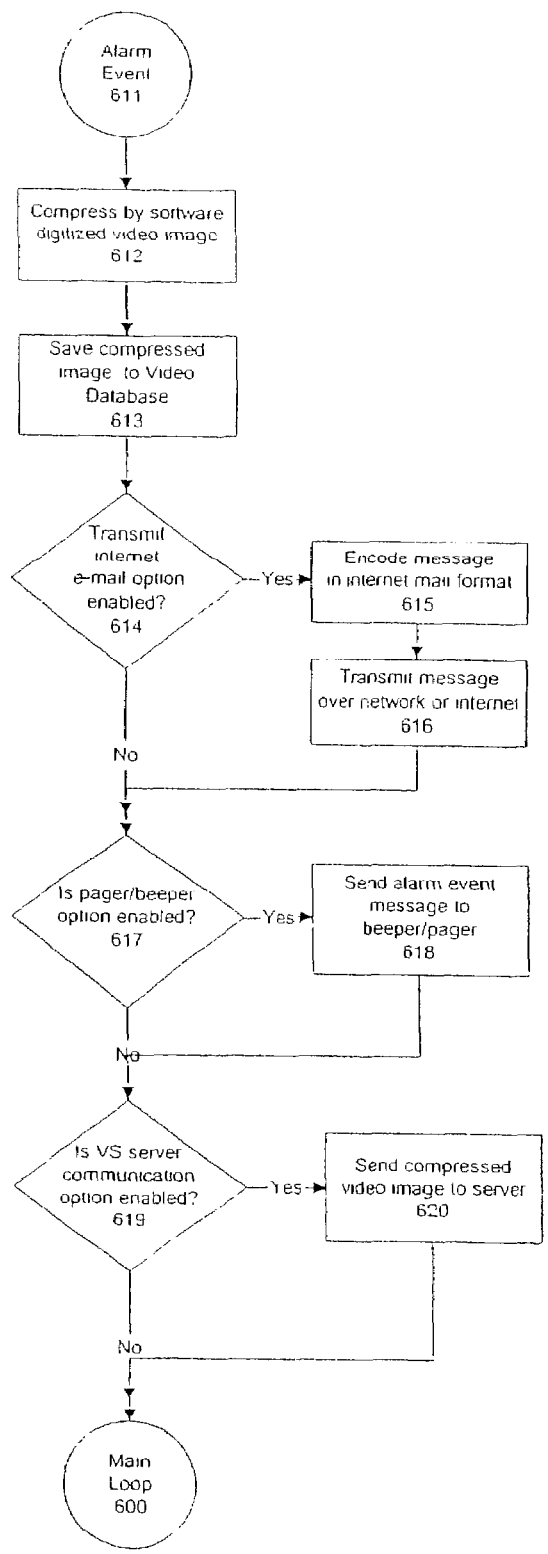
FIG. 9B is a block diagram of a second portion of the operating software.

FIGS. 9A-9B present a functional flow chart of the operation of the software of the VS client 1a-1d (FIG. 7). Since the system has many configurable options, it is easier to functionally view how the software behaves, under different configurations. After the software initializes, it enters the main loop 600. Once a camera video signal is digitized at 601, the digitized image is displayed on the screen on its assigned camera window. If the VS client is connected to a network and the transmit option is enabled at 603, the digitized camera video image is compressed by software 604, and sent to the VS server 3a-3b (FIG. 7) or to a VS remote console 5a-5b (FIG. 7).

The software incorporates a time schedule allowing the user to select the surveillance period. If the time schedule period is not ON (606), the software does not perform any other checking, returning to the main loop at 600. However if the time schedule period is ON, the software then checks if camera motion detect option is enabled at 607. If camera motion detect is enabled and motion is detected on the camera video signal 608, the software generates an alarm event 611. At 607, if the camera motion detect option is not enabled, the software checks if the device signal check option is enabled 609. If any of the devices are connected to the input logic 302 and 304 (FIG. 8), and the signal is in the ON condition, an alarm event 611 is generated.

Now referring to FIG. 9B, when an alarm event occurs at 611, the digitized camera video image is compressed at 612, and saved on a hard disk based video database 613. If the Internet mail option is enabled 614, the compressed video image is encoded in the standard SMTP and MIME Internet format 615 along with a textual message, then transmitted at 616 to an Internet mail server or network based mail server. If the beeper/pager option is enabled 617, a message is sent 618 to the beeper/pager unit. When the user receives the beeper/pager message, a standard web browser can be opened to retrieve the message with the attached video camera image from a mail account, for example. At step 619, if the VS server option is enabled, the compressed video image is sent to the VS server 620, and then the software continues again with the main loop 600, as shown on top of FIG. 9A.

Figure 1:
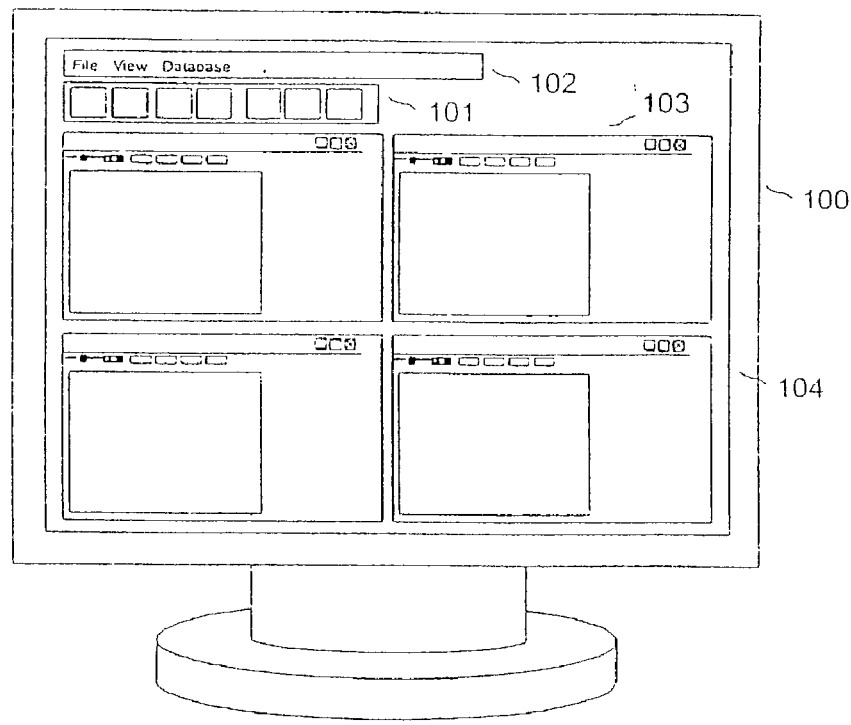
FIG. 1 is a screen display showing four camera windows according to the invention.

FIG. 1 shows a screen display 104 for four cameras. The window 104 varies in size with the monitor 100 and the type of video interface card being used. Regardless of what type of monitor is used, the operating system automatically adjusts the size of the window 104. Most windows based operating systems today employ this kind of functionality. Although the preferred embodiment is based on the Microsoft Windows operating system, the invention may use any commercially available operating systems as they evolve, including Linux. The window holds three main components: main menu 102, toolbar 101, and the camera windows 103. The main menu 102 allows the user to set all the configurable options of the system. The toolbar 101 allows the user to turn ON/OFF, arrange, resize and optimize in the mainframe window 104 the camera windows and to stop/start the video surveillance.

Figure 2:
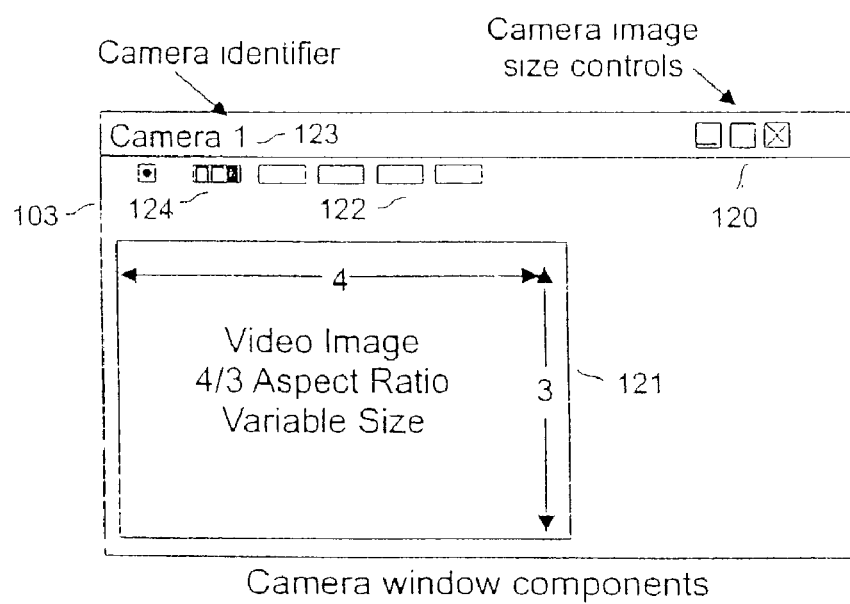
FIG. 2 illustrates the camera window components for a particular screen format.

FIG. 2 is a zoom of the camera window format (103 of FIG. 1). The main window components are the camera image size controls 120, camera video image 121, status indicators and control icons 122, and the camera identifier 123. The image size controls 120 are used to minimize, maximize and close the camera window. The window can also be resized by the user, by clicking with the mouse the corners of the window and pulling inward or outward. Camera video image 121 dynamically adjusts whenever the user adjusts the window 103, though an aspect ratio of 4/3 is preferably maintained.

The computer automatically determines the optimal size of the camera window 121 whenever the user resizes window 103. The status indicators 124 display the status of the camera, if the camera is turned OFF or ON, or if motion is detected from the camera. The control icons 122 allow the user to adjust the settings for an individual camera, such as camera video motion detect sensitivity, video brightness and contrast adjust, and the image area of surveillance.

Figure 3:
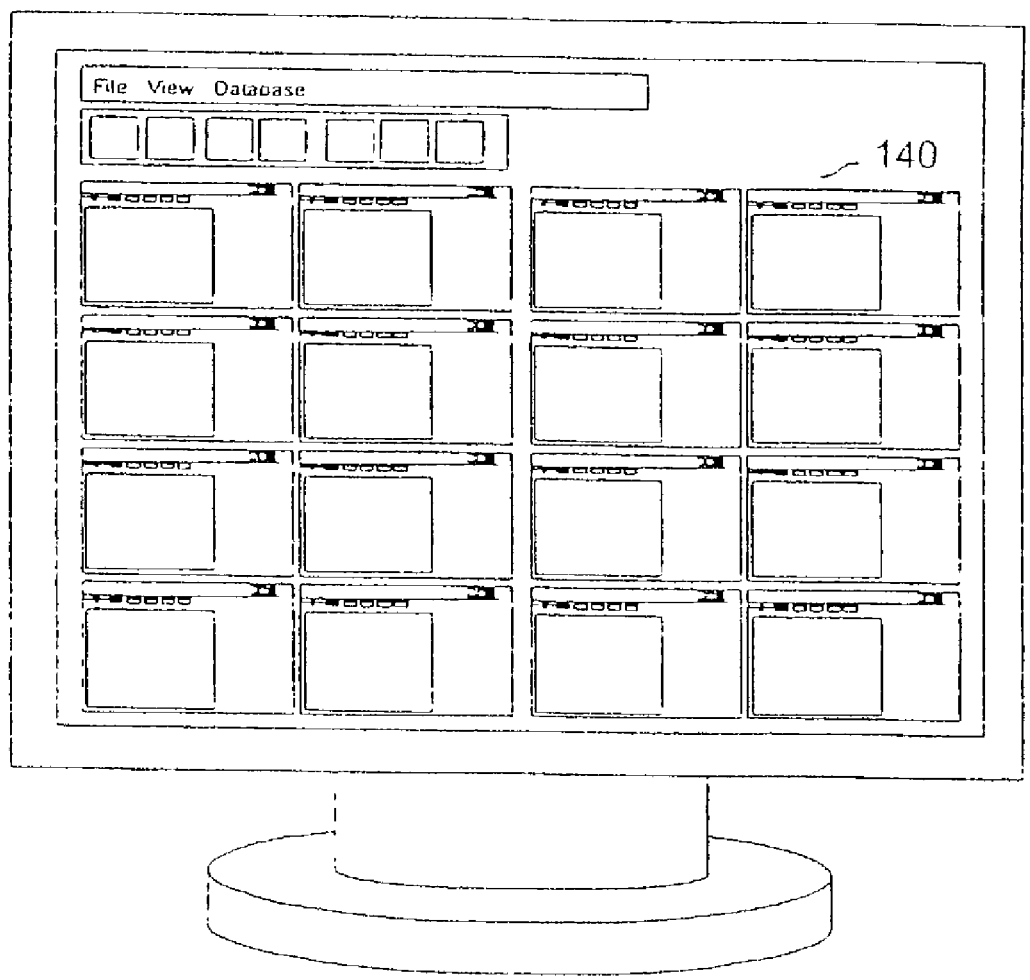
FIG. 3 illustrates an alternative screen display showing 16 camera windows.

FIG. 3 shows a display with 16 cameras and the arrangement of the windows in the screen. Once the program is started, the system finds the optimal size for each camera window and accommodates all the windows inside the mainframe window. Other configurations between 1 and 16 cameras are possible. The position and size of each window is always under operating system control unless the user manually resizes or moves the camera windows or uses any of the controls of the toolbar. Depending on the camera number used (1-16), the operating system accommodates the camera windows inside the hardware platform in order to optimize its size. The viewing window can also be resized or moved across the screen, in which case the camera windows are automatically resized and repositioned by the operating system.

Figure 4:
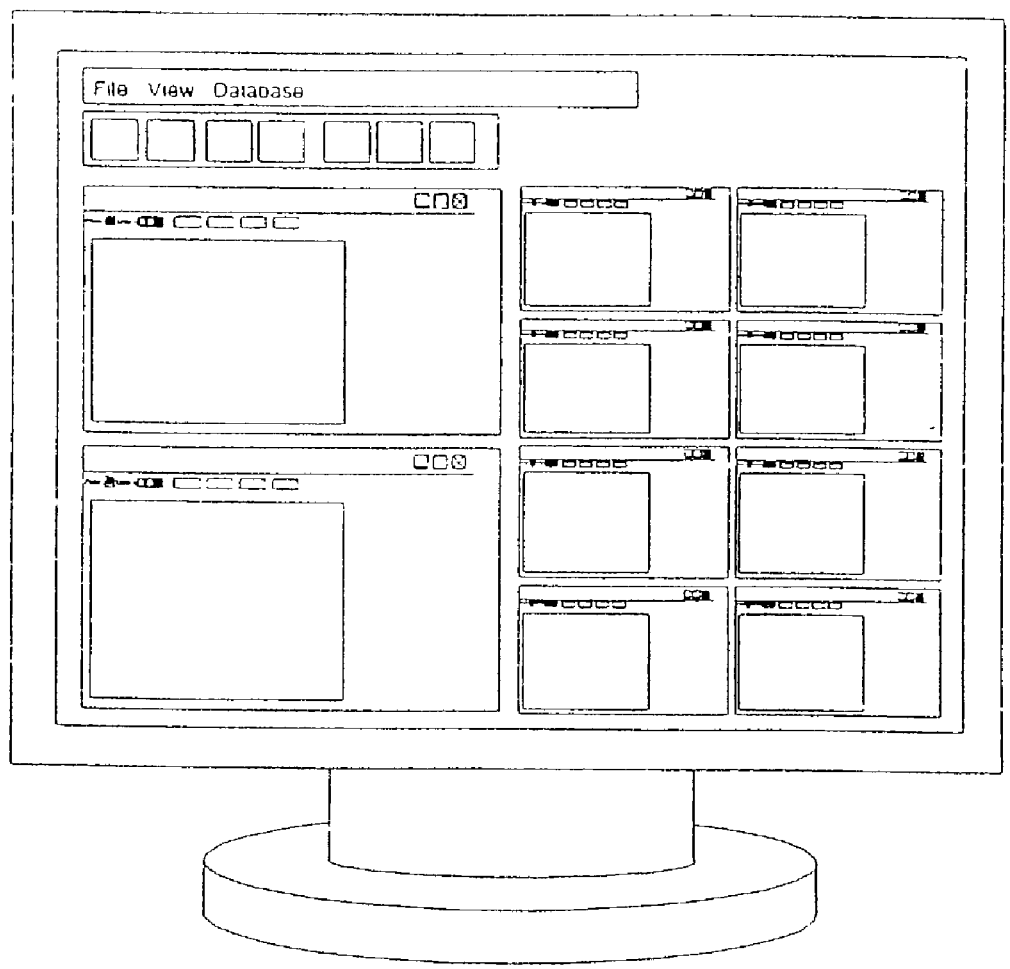
FIG. 4 illustrates an alternative configuration wherein the windows have been resized by a user.
Figure 5:
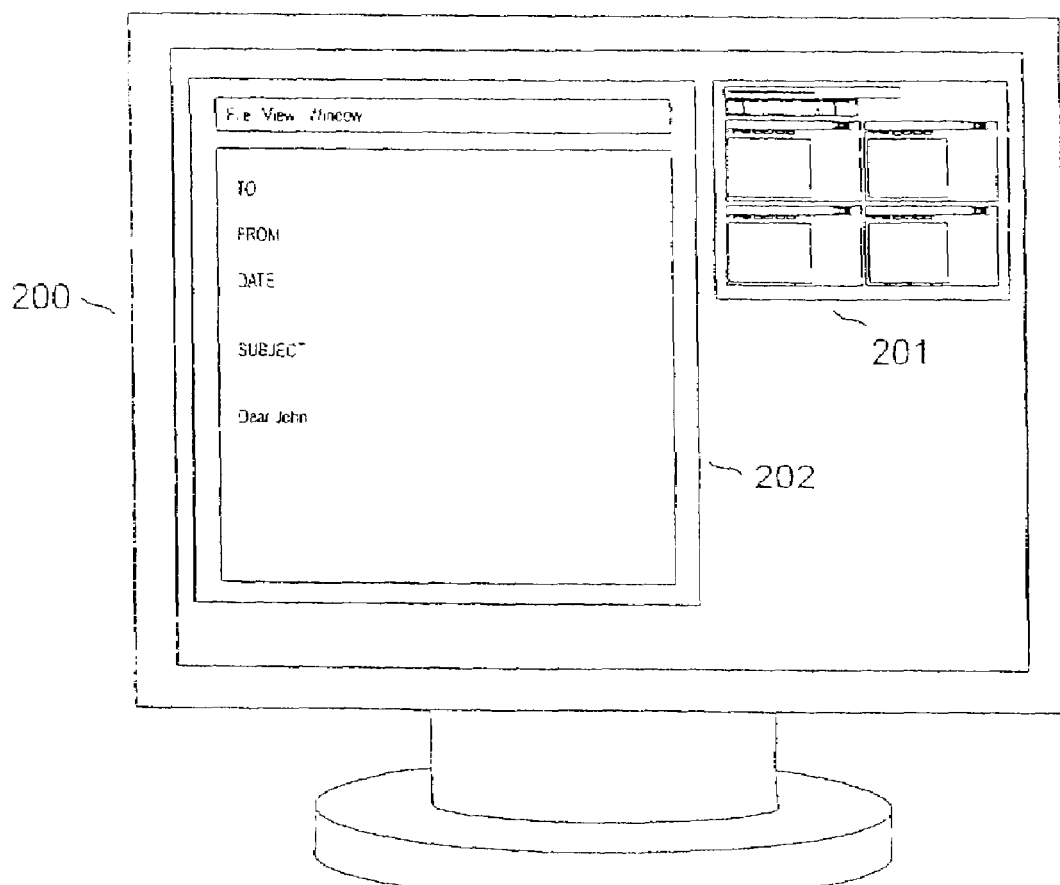
FIG. 5 shows a screen format wherein software is provided while running another application.

FIG. 4 shows an example of a 10-camera system. Two of the camera windows have been resized by the user to obtain a better view of the camera images, while the other 8cameras, presumably less important, have an smaller size. FIG. 5 shows an example in which a window 201 has been resized and moved to the upper right corner of the screen in order to run another application 202, in this case a common word processor. Such an application may be used in company lobbies, where the receptionist may use a word processor or another application, while the system is doing video surveillance in the background, with the system automatically recording any alarm events that may occur in the video database.

Figure 6:
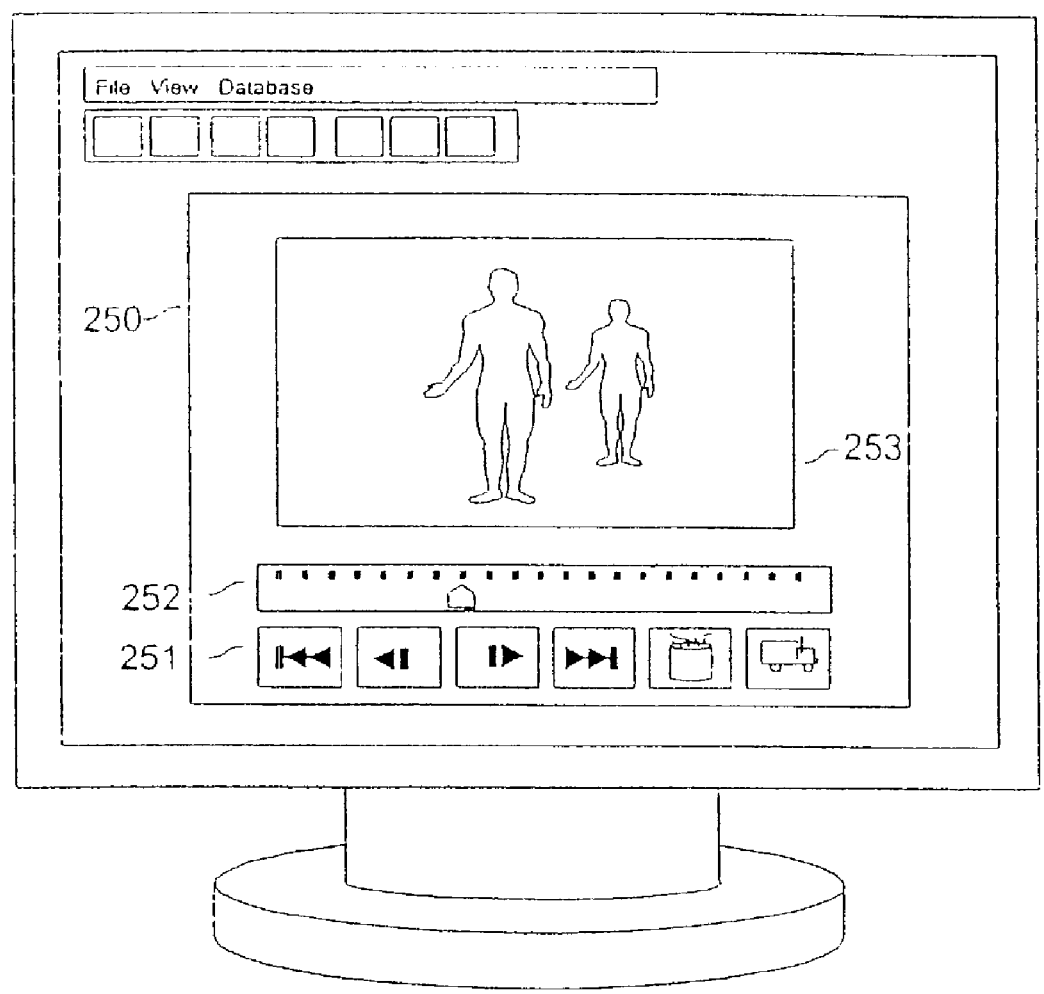
FIG. 6 shows the screen format for viewing records from a video database.

FIG. 6 shows the format of the record viewing console 250, showing the video database fast search controls. The compact disc like controls 251 are used to do single-step back and forward searching and to jump to the beginning or end of the video database. The slider control 252 is used also to position the record pointer anywhere in the video database for faster search. Controls are also provided to delete and export records. Any records retrieved from the video database are decompressed and displayed on the window 253.

Figure 9C:
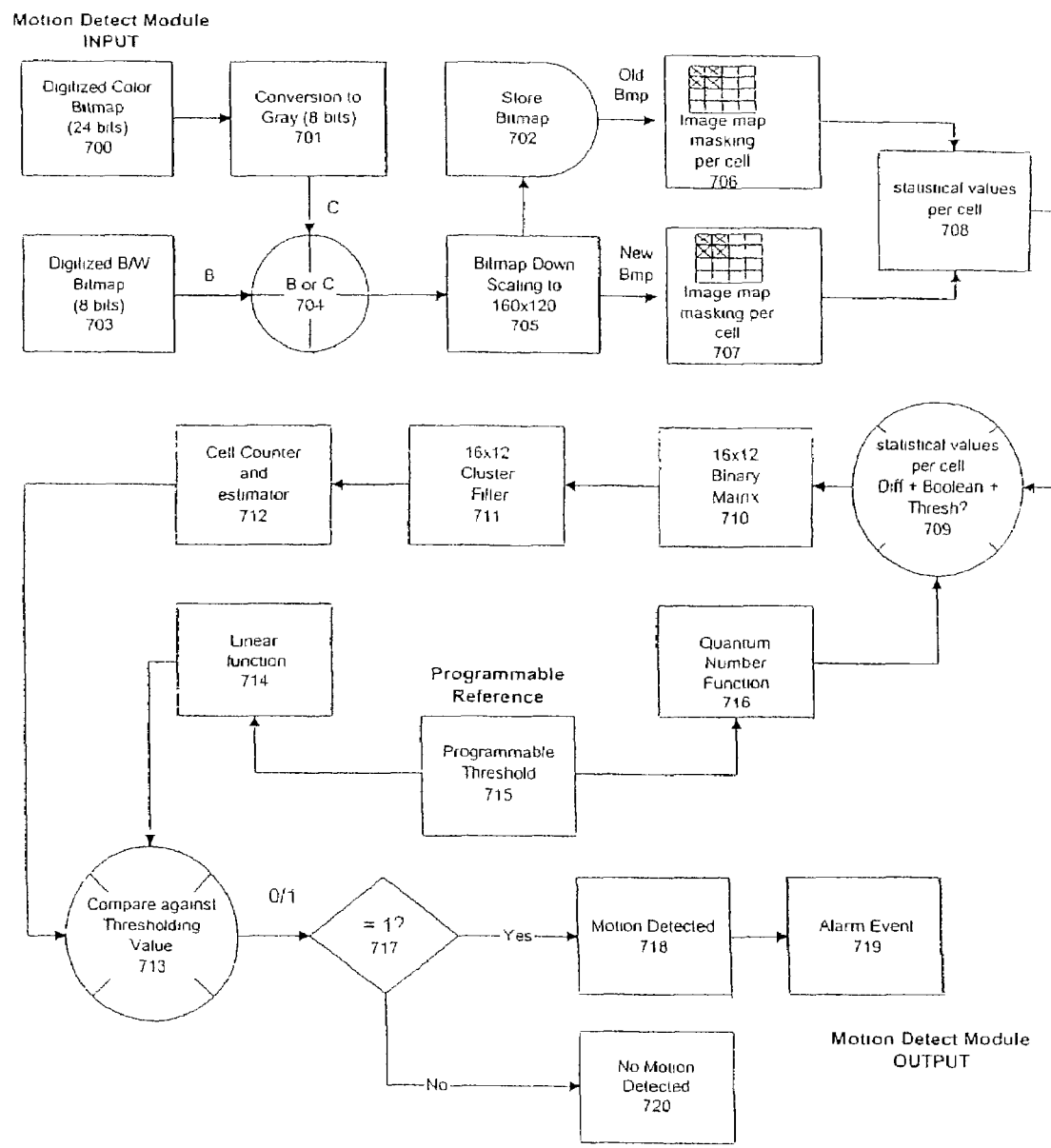
FIG. 9C is a block diagram of the operation of the camera video motion detection module.

FIG. 9C is a detailed block diagram of the motion detect algorithm employed to detect motion from the video cameras. The algorithm uses a compare last frame versus the new frame obtained from a video camera, each camera independently and at different time periods. The last frame for each video camera is therefore kept in memory at separate memory locations. In addition, the software provides a graphical user interface allowing the user to make certain areas of the video camera image insensitive to motion. This is done by dividing the entire video image screen into multiple cells of size 10×10. Once the user selects from the screen the cells sensitive to motion an image map is saved on disk for each camera independently. When the software starts the image map is loaded in memory for each camera independently to do real-time image masking.

The motion detection algorithm can process information coming from a digitized color bitmap 700 or a digitized gray level bitmap 703, at different frame sizes such as 320×240 or 640×680. When the digitized bitmap is a color bitmap 700, a conversion to gray level is done leading to a bitmap identical to a digitized-gray level bitmap 703. The gray level bitmap 704 is then scaled down (705) to a preferred embodiment fixed format 2D (two dimensions, x and y) matrix of 160×120. This process is done to increase computational speed by 4 times. Although the preferred embodiment is a 2D 160×120 matrix, other scaling factors such as 80×60 may be employed according to the application to further increase processing speed.

Statistical values 708 are obtained from the old bitmap 2D matrix 706 and the new bitmap 2D matrix 707 on a cell-by-cell basis, excluding those cells that are masked by the image map. The absolute value of the difference of these statistical values is then computed, and compared against a threshold value, which is obtained from a logarithmic quantum number function 716. A Boolean comparison is then made in which a certain logical combination of the set of statistical values occurs, produces a binary number (0 or 1). If the result of the binary comparison 709, is a logic 1, it implies that the cell changed for some reason. The reasons may be due to noise or that the portion of the image really changed do to a moving object. A binary value for each cell is stored in a binary 2D matrix 710 of 16×12.

A cluster filter 711 is applied to the 2D binary matrix 710, in which a matrix element with a binary one value that is not spatially surrounded by other matrix elements is assigned a value of zero. This filter behaves much like a spatial noise filter, in which only those matrix elements that are clustered together remain unchanged, constituting a bounded object or a group of bounded objects. This bounded object or group of bounded objects is obviously a moving object since it is the result of the change of the statistical values when comparing the previous frame with the new frame and in which noise has been eliminated.

The cell counter and percent estimator 712 scans the remains of the 2D binary matrix 711, counting how many matrix elements have a binary value of one. Since the number of elements is a fixed value (16×12=192), the number of matrix elements multiplied by 100 and divided by 192 will give the percentage of cells in which motion has been detected. The number obtained by operation 712 is then compared on 713 against the threshold number derived by the combination of the linear function 714 and the user configurable threshold 715. If no motion is detected 720, the software proceeds as normal, perhaps checking the next camera for motion. If the output of 713, is a logic one 717, then motion has been detected 718, leading to an alarm event 719. Once the alarm event is generated 719, the software then proceeds as shown in step 611 FIG. 9B.

We claim:

1. A computer especially suitable for use as a video-based security system comprising:
    a plurality of video inputs each configured to receive an electronic video signal from a video camera;
    at least one processor operationally coupled with the plurality of video inputs and configurable to operate on a digital representation of the electronic video signals from the plurality of video inputs; and
    a network connection to the Internet operationally coupled with the at least one processor, wherein when the computer detects motion in the electronic video signals, the computer generates a compressed representation that includes the motion, and wherein the computer automatically transmits the compressed representation through the network connection as part of an e-mail message only after detecting the motion, and wherein the computer transmits a separate alarm message approximately simultaneous to the transmission of the e-mail.

2. The computer of claim 1, wherein the plurality of video inputs comprise a multiplexer that receives the electronic video signals and a video processor that places a digital representation of the electronic video signal on a bus operationally coupled with the at least one processor.

3. The computer of claim 1, wherein the at least one processor is configured to detect motion by comparing at least a portion of a current frame with a previous frame of each of the electronic video signals.

4. The computer of claim 3, wherein the at least one processor is further configured to apply a user-defined mask to at least one of the electronic video signals, wherein the user-defined mask excludes at least a portion of the at least one of the electronic video signals from motion detection.

5. The computer of claim 1, further comprising a transmitter, wherein the computer sends the separate alarm message through the transmitter only after detecting the motion.

6. The computer of clam 1, wherein:
the plurality of video inputs comprise a multiplexer that receives the electronic video signals and a video processor that places a digital representation of the electronic video signal on a bus operationally coupled with the at least one processor;
the at least one processor is configured to detect motion by comparing at least a portion of a current frame with a previous frame of each off the electronic video signals, and to apply a user-defined mask to at least one of the electronic video signals, wherein the user-defined mask excludes at least a portion of the at least one of the electronic video signals from motion detection; and
the computer further comprises a transmitter configured to send the separate alarm message through the transmitter only after detecting the motion.

7. A computerized security system especially suited to generate an alarm condition upon detection of motion comprising:
at least one video input configured to receive an electronic video signal from a video camera;
at least one computer operationally coupled with the video input and configurable to operate upon a digital representation of the electronic video signal from the video input, wherein the computer is configurable to apply a user-defined mask to the digital representation of the electronic video signal, and wherein the user-defined mask inactivates at least a portion of the electronic video signal so that any motion in the inactive portion remains undetected;
a network connection to the Internet operationally coupled with the computer, wherein the computer generates a compressed representation of the electronic video signal from the video input, and wherein only when the computer detects motion in the electronic video signal, the computer automatically transmits at least a portion of the compressed representation of the electronic video signal that includes the motion as part of an e-mail message; and
an alarm server operationally coupled with the computer, wherein the alarm server is configured to transmit a separate alarm message approximately simultaneous to the transmission of the e-mail.

8. The computerized security system of claim 7, wherein the video input is configured to receive the electronic video signal in analog and provide a digital representation to the computer.

9. The computerized security system of claim 7, wherein the computer comprises a standard PC computer.

10. The computerized security system of claim 9, wherein the compressed representation is transmitted as an attachment to an e-mail.

11. The computerized security system of claim 7, wherein the alarm server comprises a beeper host computer and wherein the separate alarm message comprises a beeper message.

12. A computerized video surveillance system comprising:
a first computer operationally coupled with a plurality of video cameras and configured to detect motion from electronic signals received from the plurality of video cameras and further configured to save and transmit as part of an e-mail message only a compressed portion of the electronic signals that include motion;
a second computer operationally coupled with the first computer and configured to receive the compressed portion of the electronic signals that include motion as part of the e-mail message; and
a third computer operationally coupled with the first computer and configured to send an alarm message upon detection of motion so that the compressed portion of the electronic signals that include motion can be viewed from the second computer.

13. A method of operating a video surveillance system comprising the steps of:
detecting motion in a video signal;
compressing a portion of the video signal that includes the detected motion; and
transmitting the compressed portion of the video signal that includes the detected motion as part of an e-mail only after the step of detecting motion;
accepting a user-defined mask having active and inactive cells, wherein any motion that occurs in the inactive cells remains undetected; and
transmitting an alarm message separate from the e-mail approximately simultaneous to the transmission of the e-mail.

* * * * *